US012618516B2

(12) United States Patent
Kato

(10) Patent No.: US 12,618,516 B2
(45) Date of Patent: May 5, 2026

(54) TANK AND METHOD OF MANUFACTURING THE SAME

(71) Applicant: TOYOTA JIDOSHA KABUSHIKI KAISHA, Toyota (JP)

(72) Inventor: Kei Kato, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 64 days.

(21) Appl. No.: 18/507,244

(22) Filed: Nov. 13, 2023

(65) Prior Publication Data

US 2024/0218974 A1 Jul. 4, 2024

(30) Foreign Application Priority Data

Dec. 28, 2022 (JP) ................................ 2022-211929

(51) Int. Cl.
*F17C 1/06* (2006.01)

(52) U.S. Cl.
CPC ........ *F17C 1/06* (2013.01); *F17C 2201/0109* (2013.01); *F17C 2203/0604* (2013.01); *F17C 2203/0624* (2013.01); *F17C 2203/0673* (2013.01); *F17C 2209/2154* (2013.01); *F17C 2209/232* (2013.01); *F17C 2221/012* (2013.01); *F17C 2221/033* (2013.01); *F17C 2260/011* (2013.01)

(58) Field of Classification Search
CPC ................ F17C 1/06; F17C 2201/0109; F17C 2203/0604; F17C 2203/0624; F17C 2209/2154; F17C 2209/232; F17C 2221/012; F17C 2221/033; F17C 2260/011; F17C 1/16; F17C 13/002; F17C 2203/0663; F17C 2209/227; F17C 2205/0305; Y02E 60/32
USPC .......................................................... 220/590
See application file for complete search history.

(56) References Cited

U.S. PATENT DOCUMENTS

| | | | | |
|---|---|---|---|---|
| 5,385,263 A * | 1/1995 | Kirk | F17C 1/16 | 206/443 |
| 2006/0096993 A1* | 5/2006 | Takashima | F17C 1/06 | 220/495.01 |
| 2010/0276434 A1* | 11/2010 | Berger | F17C 1/16 | 427/372.2 |
| 2022/0032531 A1* | 2/2022 | Katano | B29C 53/602 | |
| 2022/0034450 A1* | 2/2022 | Katano | B29C 70/32 | |

(Continued)

FOREIGN PATENT DOCUMENTS

| | | | |
|---|---|---|---|
| JP | H08-510428 A | 11/1996 | |
| JP | 2020112189 A | 7/2020 | |
| WO | WO-2021165607 A1 * | 8/2021 | F17C 1/16 |

OTHER PUBLICATIONS

English Machine Translation of WO-2021165607-A1 (Year: 2021).*

*Primary Examiner* — Laura E. Parker
(74) *Attorney, Agent, or Firm* — Dickinson Wright, PLLC

(57) ABSTRACT

To provide a tank capable of reducing a fiber bundle amount while ensuring strength. A tank having a tank body portion capable of filling a gas therein, the tank body portion comprising: a liner having a hollow cylindrical shape; and a fiber bundle layer covering an outer surface of the liner, wherein the fiber bundle layer has an inner layer, an outer layer, and an intermediate layer disposed between the inner layer and the outer layer, the end portion of the intermediate layer being located axially inwardly than the end portion of the fiber bundle layer.

2 Claims, 7 Drawing Sheets

(56) References Cited

U.S. PATENT DOCUMENTS

| | | | | |
|---|---|---|---|---|
| 2022/0316655 | A1 * | 10/2022 | Tsuchiyama | F17C 1/16 |
| 2022/0412510 | A1 * | 12/2022 | Tatsushima | F17C 1/06 |
| 2023/0017919 | A1 * | 1/2023 | Kai | F17C 1/16 |

* cited by examiner

CONVENTIONAL

TANK AND METHOD OF MANUFACTURING THE SAME

FIELD

The present application relates to a tank and a method of manufacturing the same

BACKGROUND

As for a high-pressure gas tank for storing hydrogen gas or the like, a tank in which a fiber bundle layer is arranged in a hollow cylindrical liner is known. For example, Patent Document 1 discloses a pressure vessel including a liner in which a gas is filled inside, a reinforcing portion formed in contact with an outer surface of the liner using a fiber-reinforced resin and covering the liner from the outside, and a predetermined mouthpiece.

CITATION LIST

Patent Literature

Patent Literature 1 JP 2020-112189 A

SUMMARY

Technical Problem

Usually, the tank body has a hollow cylindrical shape. The tank body is provided with a barrel, a small diameter end, and a shoulder connecting them. The main body of the tank is sometimes fabricated by a braiding method in which fiber bundles are knitted on the liner surface. In this case, the amount of the fiber bundle becomes the same even if it is a torso portion or a small diameter end portion. Since the fiber bundle amount is determined based on the strength of the trunk portion, the small diameter end portion having a small outer diameter becomes excessive in the fiber bundle amount.

Accordingly, it is a primary object of the present disclosure to provide a tank and a method of manufacturing the same, which can reduce the amount of fiber bundles while ensuring strength.

Solution to Problem

As one aspect for solving the above problem, the present disclosure provides a tank comprising a tank body portion capable of filling a gas inside, wherein the tank body portion includes a liner having a hollow cylindrical shape and a fiber bundle layer covering an outer surface of the liner, wherein the fiber bundle layer has an inner layer, an outer layer, and an intermediate layer disposed between the inner layer and the outer layer, and an end portion of the intermediate layer is located axially inside the end portion of the fiber bundle layer.

The tank may comprise a mouthpiece disposed at the small diameter end of the tank body. In this case, an end portion of the intermediate layer may be located axially inward of the mouthpiece. The fiber bundle layer may have an adhesive layer inside the intermediate layer and near the end of the intermediate layer.

As one aspect for solving the above problem, the present disclosure is a method of manufacturing a tank body portion provided with a tank body portion provided with a tank body portion capable of filling a gas inside, and includes a tank body portion manufacturing step of disposing a fiber bundle layer covering an outer surface of a liner having a hollow cylindrical shape, wherein the fiber bundle layer has an inner layer, an outer layer, and an intermediate layer disposed between the inner layer and the outer layer, and the tank body portion manufacturing step includes an inner layer disposing step of disposing an inner layer on an outer surface of the liner, an intermediate layer disposing step of disposing an intermediate layer on an outer surface of the inner layer, a cutting step of cutting the intermediate layer so that an end portion of the intermediate layer is positioned axially inward than an end portion of the fiber bundle layer, and an outer layer disposing step of disposing an outer layer on an outer surface of the inner layer and the intermediate layer.

The above manufacturing method may include a mouthpiece arrangement step of disposing a mouthpiece at a small diameter end portion of the tank body portion after the tank body portion manufacturing step. In this case, in the cutting step, the intermediate layer may be cut so that the end portion of the intermediate layer is positioned axially inward of the mouthpiece.

The tank body portion manufacturing step may include an adhesive layer disposing step between the intermediate layer disposing step and the cutting step. In this case, the adhesive layer disposing step may form an adhesive layer inside the intermediate layer and in the axial direction inside the cutting position of the intermediate layer to be cut in the cutting step and in the vicinity of the cutting position.

Advantageous Effect

According to the tank of the present disclosure, it is possible to reduce the amount of fiber bundles while ensuring strength. Further, according to the method of manufacturing a tank of the present disclosure, it is possible to manufacture a tank capable of reducing the amount of fiber bundles while ensuring strength.

DESCRIPTION OF THE PREFERRED EMBODIMENTS

[Tank]

Figure 1:
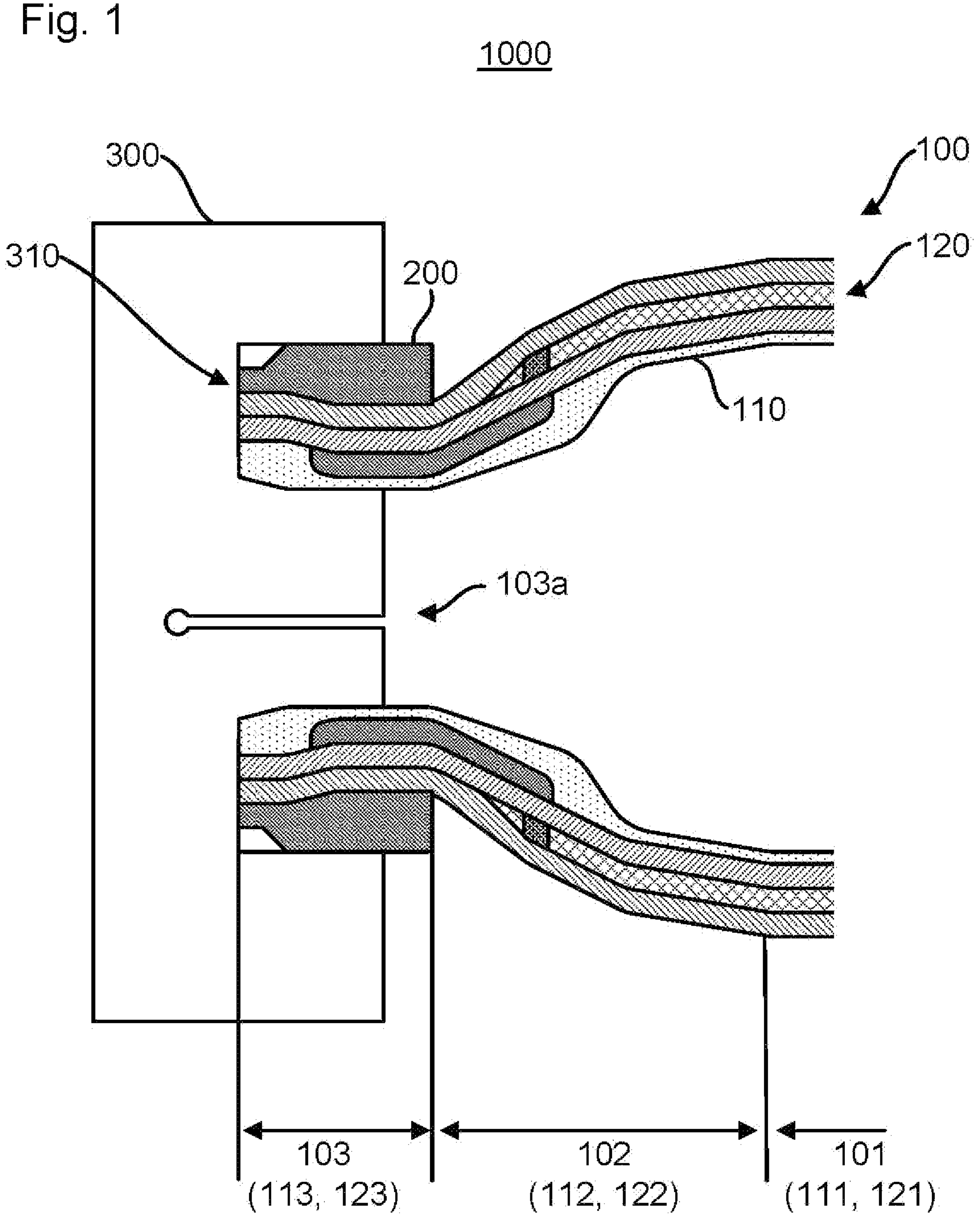
FIG. 1 is a cross-sectional schematic view of the end of the tank 1000.
Figure 2:
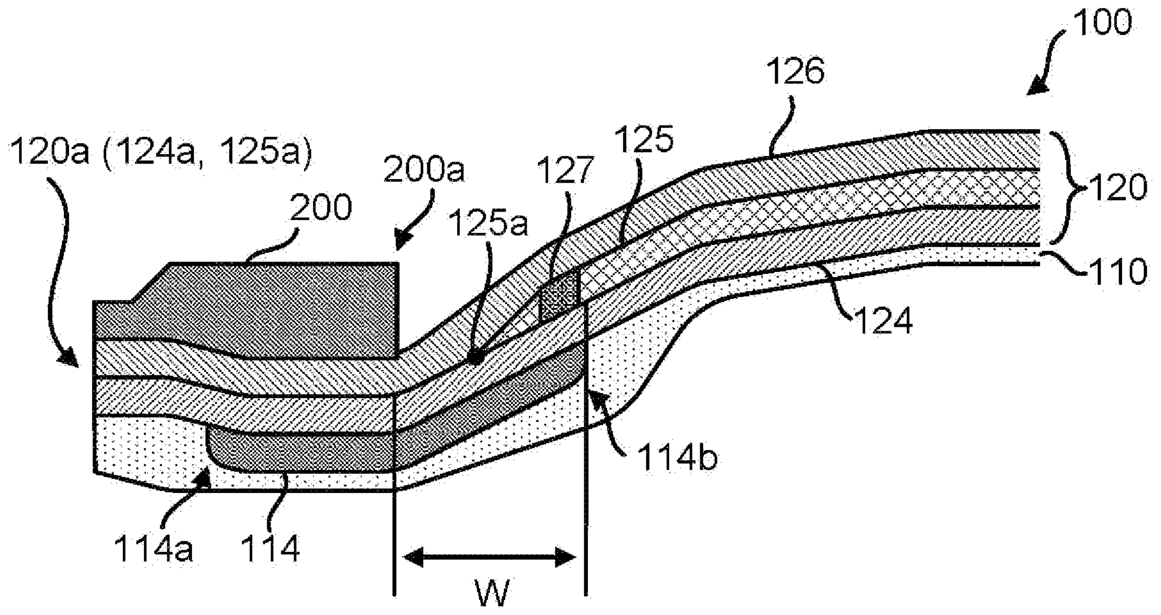
FIG. 2 is a cross-sectional schematic view of the end of the tank body portion 100.

A tank of the present disclosure will be described using a tank 1000 which is an embodiment. FIG. 1 shows a cross-sectional schematic view of the end of the tank 1000. FIG. 2 shows a cross-sectional schematic view of the end of the tank body portion 100.

The tank 1000 includes a tank body 100, a base 200, and a manifold 300. The tank body 100 may be filled with a gas therein. Mouthpiece 200 is disposed on the small-diameter end 130 of the tank body 100. Manifold 300 covers the mouthpiece 200 and is a member that closes the opening 103*a* of the reservoir body 100.

<Tank Body Portion 100>

The tank body 100 may be filled with a gas therein. The type of gas is not particularly limited. Examples thereof include hydrogen and natural gas. In addition, the gas is usually filled in the tank body portion 100 in a high pressure state.

As shown in FIG. 1, the tank body 100 has a hollow cylindrical shape. Tank body 100 includes a barrel 101, a shoulder 102, and a small diameter end 103. Body portion 101 is the largest portion of the outer diameter, a portion extending in the axial direction of the tank body portion 100. Small diameter end 103 has a smaller outer diameter than the body portion, a portion corresponding to the end of the tank body portion 100. The small diameter end 103 may be disposed only on one of the tank body portions 100 and may be disposed on both ends. Small diameter end 103 includes an opening 103*a* which communicates with the interior of the reservoir body 100. The opening 103*a* is closed by manifolds 300. Shoulder 102 is a portion for connecting the barrel portion 101 and the small-diameter end portion 103, the outer diameter toward the outer side in the axial direction is formed to be small.

Here, the axial direction is a direction passing through the central axis of the tank body portion 100. Axial direction in FIG. 1 is a lateral direction.

The tank body 100 comprises a liner 110 having a hollow cylindrical shape and a fiber bundle layer 120 covering the outer surface of the liner 110.

(Liner 110)

The liner 110 is made of a resin material such as nylon. The liner 110 is the innermost layer of the tank body portion and is the underlying portion of the shape of the tank body portion 100. Accordingly, the liner 110 includes a portion (liner body 111, liner shoulder 112, and liner small diameter end 113) corresponding to the barrel 101, shoulder 102, and small diameter end 103 of the tank body 100.

As shown in FIG. 2, liner 110 includes an insert ring 114 proximate a small liner diameter end 113. Insert ring 114 is a cylindrical member, the small-diameter end portion 103 of the tank body portion 100 by the internal pressure of the gas to be filled is deformed (opening), thereby having a role of suppressing the airtightness is impaired. Thus, an insert ring 114 is provided at least at the liner small diameter end 113 Further, as shown in FIG. 2, the insert ring 114 may be formed from the liner small diameter end 113 over the shoulder 112. That is, one end 114*a* of the insert ring 114 may be disposed at the liner small diameter end 113 and the other end 114*b* may be disposed at the liner shoulder 112 Since the position of the other end 114*b* of the insert ring 114 is related to the position of the end portion 122*a* of the intermediate layer 125 described later, it will be described in detail later.

(Fiber Bundle Layer 120)

Fiber bundle layer 120 is the outermost layer of the tank body portion is a portion constituting the external shape of the tank body portion 100. Accordingly, the fiber bundle layer 120 includes a portion (the fiber bundle layer trunk portion 121, the fiber bundle layer shoulder portion 122, and the fiber bundle layer small diameter end portion 123) corresponding to the trunk portion 101, the shoulder portion 102, and the small diameter end portion 103 of the tank body portion 100

The fiber bundle layer 120 is formed of a fiber-reinforced resin such as carbon fiber. Usually, a fiber bundle layer 120 is formed by knitting a fiber bundle formed by forming a plurality of fiber-reinforced resins into one bundle on an outer surface of a liner 110 The number of fiber-reinforced resins in the fiber bundle is not particularly limited, but is, for example, 10 or more and 100 or less. The braiding of the fiber bundles is carried out multiple times. Therefore, the fiber bundle layer 120 is obtained by laminating a plurality of single layers (fiber bundle single layers) of the knitted fiber bundle.

Since the fiber bundle layer 120 is formed in this manner, it is not possible to distinguish the layer configuration at a glance. However, in the present disclosure, the fiber bundle layer 120 will be described as a distinction between the inner layer 124, the intermediate layer 125, and the outer layer 126 for convenience depending on the role. Accordingly, in the present disclosure, the fiber bundle layer 120 includes an inner layer 124, an intermediate layer 125, and an outer layer 126

Inner layer 124 is the innermost layer of fiber bundle layer 120. Inner layer 124 covers the entire outer surface of liner 110. The fiber bundle layer 120 may be manufactured through a step of cutting a portion of the intermediate layer 125, as will be described later. In such a case, the inner layer 124 serves to protect the liner 110 from load during cutting of the intermediate layer 125 The number of fiber bundle monolayers in the inner layer 124 can be appropriately set according to the purpose. For example, the number of fiber bundle monolayers in the inner layer 124 may be larger than the number of fiber bundle monolayers in the outer layer 126 Specifically, the number of fiber bundle monolayers in the inner layer 124 may be 1 or more and 5 or less layers.

Intermediate layer 125 is a layer disposed between inner layer 124 and outer layer 126 As shown in FIG. 2, the end 125*a* of the intermediate layer 125 is located axially inward of the end 120*a* of the fiber bundle layer 120 (the end 124*a* of the inner layer 124 and the end 126*a* of the outer layer 126). That is, the intermediate layer 125 does not cover the entire outer surface of the inner layer 124 Intermediate layer 125 is disposed on the outer surface of inner layer 124 except for the end 120*a* of fiber side layer 120. By disposing the intermediate layer 125 in this manner, it is possible to reduce the amount of fiber bundle used for the fiber bundle layer 120 Thus, the intermediate layer 125 has a role of reducing the amount of fiber bundles used in the fiber bundle layer 120 Further, since the intermediate layer 125 is present in the fiber bundle layer trunk portion 121 in the same manner as in the prior art, the strength of the tank body portion 100 can be ensured.

Further, in order to ensure the strength of the tank body portion 100, the intermediate layer 125 needs to be disposed at least in a portion corresponding to the body portion 101 of the inner layer 124. Therefore, the end 125*a* of the intermediate layer 125 is axially inner than the end 120*a* of the fiber bundle layer 120 and is located axially outer than the trunk portion 101 (the shoulder portion 102 or the small diameter end portion 103)

As shown in FIG. 2, the end 125*a* of the intermediate layer 125 may be positioned axially inner than the base 200 (specifically, axially inward than the end 200*a* axially inward of the base 200).

Thus, it is possible to reduce the outer diameter of the small-diameter end portion 103 of the tank body portion 100. Further, it is possible to reduce the insertion hole 310 of the outer diameter and the manifold 300 of the mouthpiece 200. In addition, an end 125*a* of the intermediate layer 125 may be disposed in an area overlapping with the insert ring 114 In other words, the end 125*a* of the intermediate layer 125 may be disposed axially inward of one end 114*a* of the insert ring 114 and axially outward of the other end 114*b* As will be described later, the fiber bundle layer 120 may be manufactured through a step of cutting a portion of the intermediate layer 125 (cutting process S14) In such cases, the insert ring 114 may protect the liner 110 from the load upon cutting of the intermediate layer 125.

Thus, the end 125*a* of the intermediate layers 125 may be axially inner of the mouthpiece 200 and disposed in a more axially outward extent (W in FIG. 2) than the other end 114*b* of the insert ring 114. Thus, it is possible to reduce the outer diameter of the small-diameter end portion 103 of the tank body portion 100, and to protect the liner 110 from the load at the time of cutting of the intermediate layer 125. Further, it is possible to reduce the amount of fiber bundles used in the fiber bundle layer 120

Figure 3:
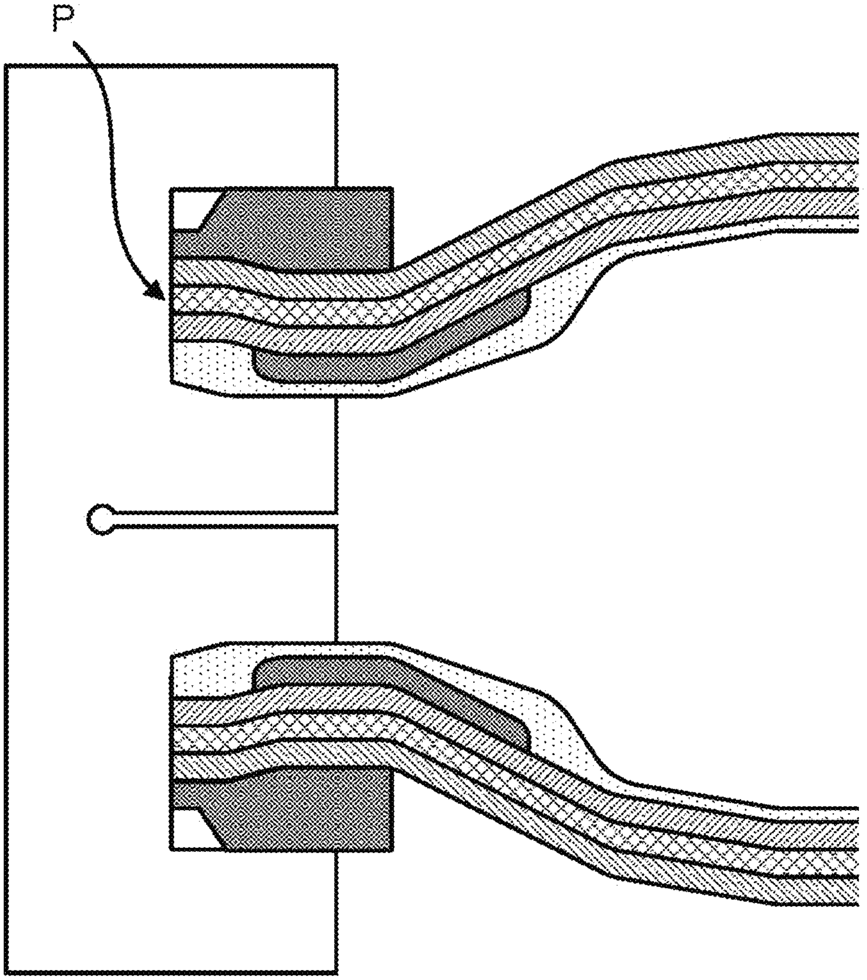
FIG. 3 is a cross-sectional schematic view focusing on the end of the conventional tank.

In order to explain the effect of the intermediate layer 125 described above in detail, it is compared with a conventional tank. FIG. 3 shows a cross-sectional schematic view of the end of a conventional tank. As shown in FIG. 3, in the conventional tank, the end P of the intermediate layer is disposed at the end of the fiber bundle layer, and the intermediate layer covers the entire surface of the inner layer. Therefore, in the conventional tank, the outer diameter of the small diameter end portion of the tank body portion becomes larger than that of the tank 1000, and the amount of the fiber bundle used in the fiber bundle layer also increases. Therefore, the above-described effect cannot be obtained in the conventional tank.

The intermediate layer 125 is for reducing the number of fiber bundle monolayers of the fiber bundle layer small diameter end portion 123 Therefore, the number of fiber bundle monolayers in the intermediate layer 125 can be appropriately set depending on the purpose. For example, the number of fiber bundle monolayers in the intermediate layer 125 may be larger than the number of fiber bundle monolayers in the inner layer 124 and the outer layer 126 Specifically, it may be 3 or more layers and 10 or less layers.

The outer layer 126 is an outermost layer of the fiber bundle layer 120 and covers an outer surface of the intermediate layer 125 and the inner layer 124 (a portion of the inner layer 124 that is not covered by the intermediate layer 125) The outer layer 126 serves to suppress fraying of the end 125*a* of the intermediate layer 125 This is because fraying of the end 125*a* may reduce the strength of the tank body. The number of fiber bundle monolayers in the outer layer 126 can be appropriately set according to the purpose. For example, the number of fiber bundle monolayers in the outer layer 126 may be less than the number of fiber bundle monolayers in the inner layer 124 Specifically, the number of fiber bundle monolayers in the outer layer 126 may be 1 or more and 5 or less layers.

As shown in FIG. 2, the fiber bundle layer 120 may have an adhesive layer 127 inside the intermediate layer 125 and near the end 125*a* of the intermediate layer 125 Thus, the respective fiber bundle single layers contained in the intermediate layer 125 are adhered to each other, and fraying on the end 125*a* is further suppressed. When an adhesive layer 127 is provided on the end 125*a*, it may be difficult to cut the intermediate layer 125 to be described later. Therefore, the arrangement position of the adhesive layer 127 excludes the cutting position of the intermediate layer 125. There is no particular limitation on the material constituting the adhesive layer 127, and any material capable of bonding the intermediate layer 125 and the inner layer 124 may be used. For example, a known adhesive can be appropriately employed.

Note that, since the adhesive layer 127 is an optional member, the fiber side layer 120 may not include the adhesive layer 127 This is because, even if the adhesive layer 127 is not provided, fraying of the end portion 125*a* of the intermediate layer 125 can be suppressed by the outer layer 126

(Laminated Structure)

Figure 4A:
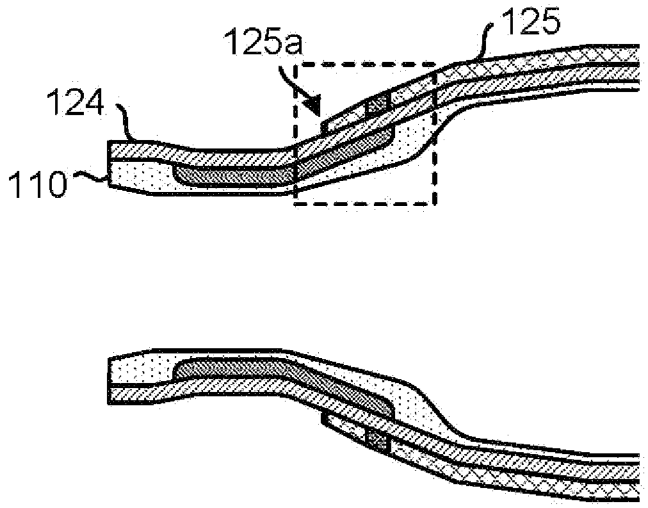
FIG. 4A is a cross-sectional view of placing the inner layer 124 and the intermediate layer 125 in the liner 110.
Figure 4B:
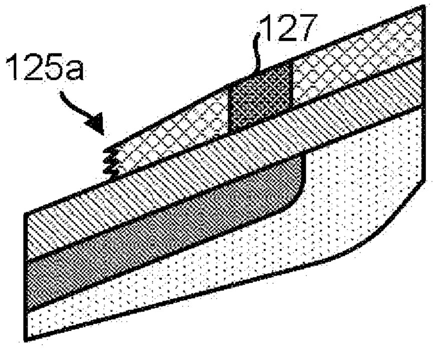
FIG. 4B is an enlarged view of the portion surrounded by the dotted line in FIG. 4A)
Figure 4C:
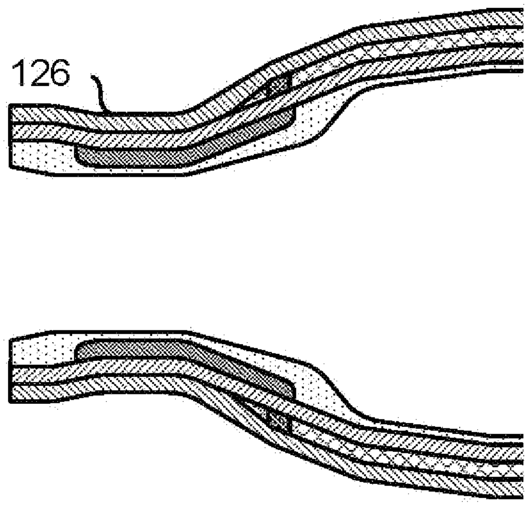
FIG. 4C is a cross-sectional view further arranged outer layer 126.

Furthermore, a description will be given of a laminated structure of the tank body portion 100. 4A is a cross-sectional view of liner 110 with inner layer 124 and intermediate layer 125 disposed therein. The view 4B is an enlarged view of the part of the view 4A surrounded by the dotted line. FIG. 4C is a cross-sectional view further arranged outer layer 126. As shown in the drawing 4A, the end 125*a* of the intermediate layer 125 is disposed axially inward than the end 124*a* of the inner layer 124. Here, when the end portion 125*a* of the intermediate layer 125 is formed by cutting the intermediate layer 125, the end portion of the fiber bundle single layer forming the intermediate layer 125 is exposed as shown in 4B of the drawing, and fraying tends to occur on the end portion 125*a* Therefore, as shown in the drawing 4C, the outer layer 126 is further disposed, and the entire intermediate layer 125 is covered with the outer layer 126, thereby suppressing fraying of the end portion 125*a* of the intermediate layer 125 Thus, in order to reduce the amount of fiber bundles and to suppress fraying, the fiber bundle layer is composed of 3 layers. Such layers can be distinguished, for example, on the basis of cross-sectional CT images.

<Mouthpiece 200>

Mouthpiece 200 is intended to be disposed in the small-diameter end 103 of the tank body 100, has a role of fixing the tank body 100 and the manifold. The outer surface of the base 200 may have a plurality of grooves for threading with the manifold 300. Such a mouthpiece 200 may be a known one.

<Manifold 300>

Manifold 300 is connected to the mouthpiece 200 is a member (cover) for closing the opening 103*a* of the tank body portion 100. By arranging the manifold 300, it is possible to seal the gas filled in the inside of the tank body portion 100 As shown in FIG. 1, the manifold 300 includes an insertion hole 310 for inserting the small-diameter end 103 and the mouthpiece 200 of the tank body 100. The side surface of the insertion hole 310 may have a plurality of grooves for screwing with the base. Such a manifold 300 may be a known one.

As described above, a tank of the present disclosure has been described using an embodiment. In the tank of the present disclosure, an end portion of the intermediate layer is located axially inner of an end portion of the fiber bundle layer. In addition, the fiber bundle layer in the trunk portion is similar to that of a conventional tank. Accordingly, according to the tank of the present disclosure, it is possible to reduce the amount of fiber bundles while ensuring strength.

[Method for Producing Tank]

Figure 5:
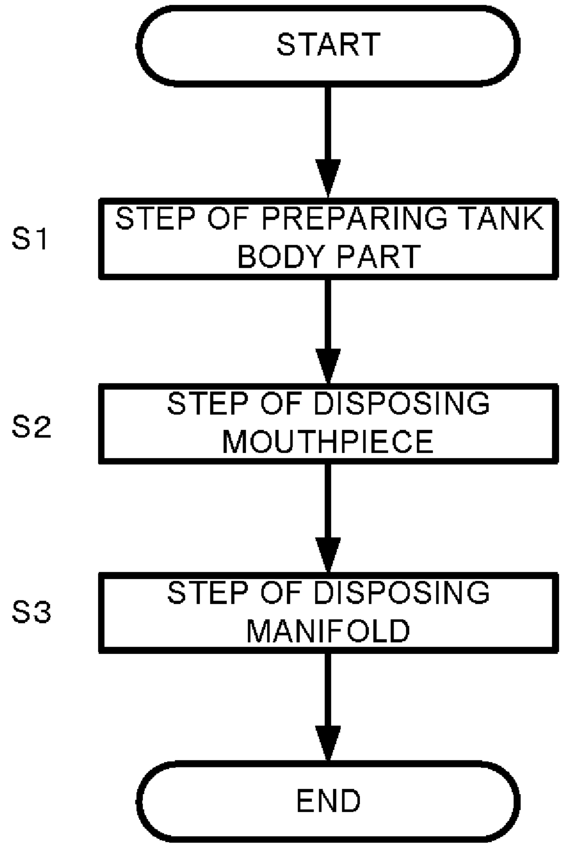
FIG. 5 is a flowchart of a manufacturing method of an embodiment.
Figure 6:
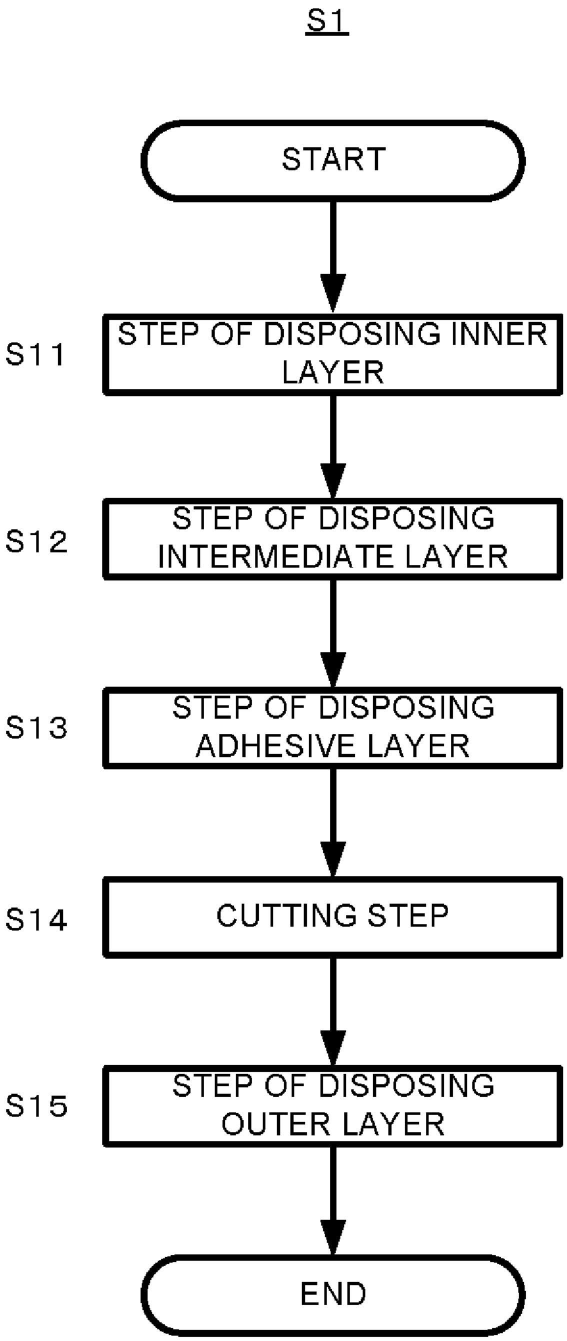
FIG. 6 is a flow chart of the tank main body portion manufacturing process S1.
Figure 7:
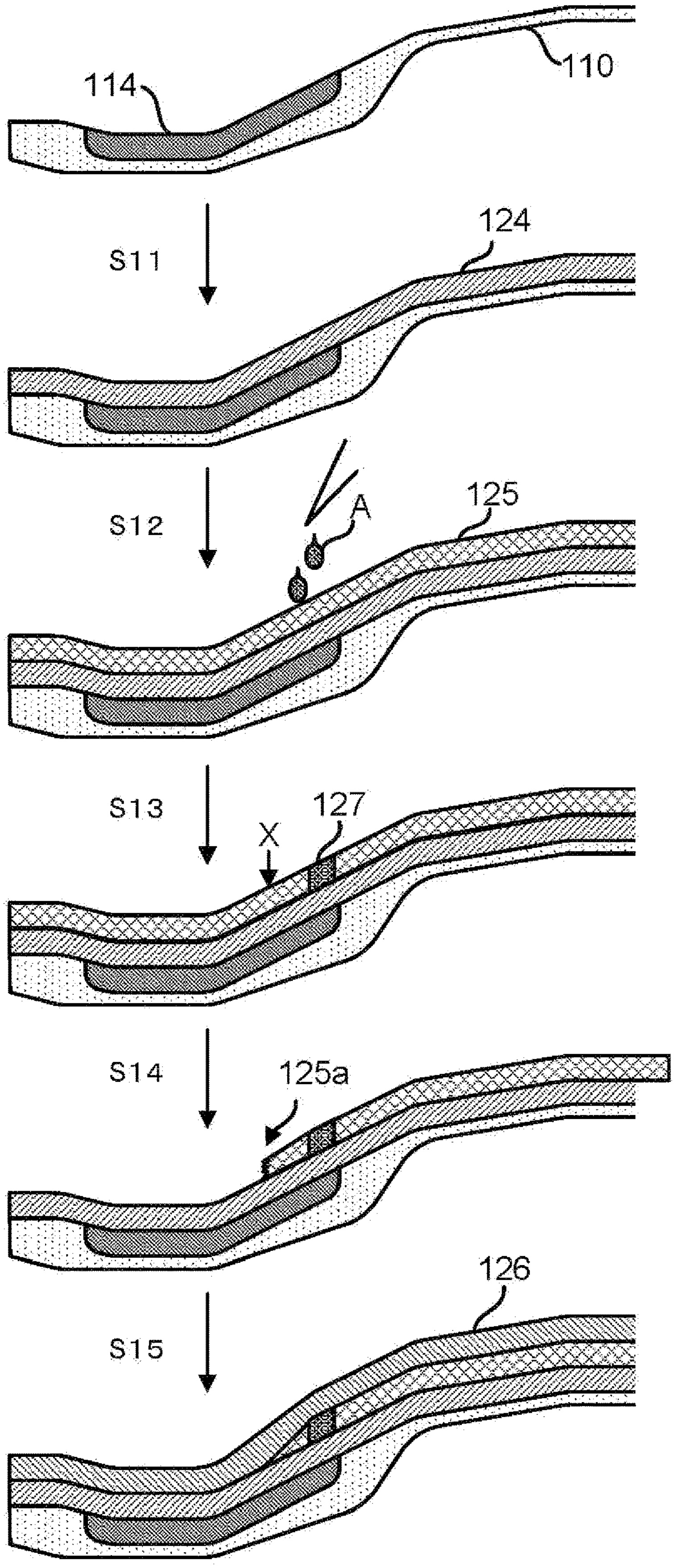
FIG. 7 is a schematic view of a tank main body portion manufacturing process S1.

A method of manufacturing a tank of the present disclosure will be described using a method of manufacturing a tank 1000 which is an embodiment. FIG. 5 showed the flow chart of the manufacturing method of one embodiment. FIG. 6 shows the flow chart of S1 of the tank main body preparation process. FIG. 7 shows a schematic view of S1 of the tank main body manufacturing process.

A manufacturing method of an embodiment is a method of manufacturing a tank 1000 including a tank body portion 100 capable of filling a gas inside. As shown in FIG. 5, the manufacturing process of an embodiment includes a tank main body portion manufacturing process S1, a mouthpiece arrangement process S2, and a manifold arrangement process S3.

<Tank Body Preparation Process S1>

Tank body portion preparation step S1 is the step of placing the fiber bundle layers 120 covering the outer surface of the liner 110 having a hollow-cylindrical shape. It is possible to produce the tank body portion 100 by the tank body portion manufacturing process S1. The tank body portion manufacturing process S1 is mainly carried out by knitting a fiber bundle on the surface of the liner 110, but has a step of cutting the intermediate layer 125 in the middle thereof. Although there is no particular limitation on the method of knitting the fiber bundle, for example, a braiding method can be used.

As shown in FIG. 6, the tank body part manufacturing process S1 is provided with the inner layer arrangement process S11, the intermediate layer arrangement process S12, the adhesive layer arrangement process S13, the cutting process S14, and the outer layer arrangement process S15

(Inner Layer Arrangement Process S11)

The inner layer placing step S11 is a step of placing the inner layer 124 on the outer surface of the liner 110

By knitting the fiber bundle with the outer surface of the liner 110, the inner layer 124 is formed on the entire outer surface of the liner 110

(Intermediate Layer Arrangement Process S12)

The intermediate layer arrangement step S12 is carried out after the inner layer arrangement step S11. The intermediate layer placing step S12 is a step of placing the intermediate layer 125 on the outer surface of the inner layer 124 By knitting the fiber bundle with the outer surface of the inner layer 124, the intermediate layer 125 is formed on the entire outer surface of the inner layer 124

(Adhesive-Layer Arrangement Process S13)

The adhesive layer-placing step S13 is an optional step and may not necessarily be performed. When the adhesive layer placing step S14 is performed, the tank body portion manufacturing step S1 provides an adhesive layer placing step S13 between the intermediate layer placing step S13 and the cutting step. The adhesive layer arrangement step S13 is a step of forming the adhesive layer 127 inside the intermediate layer 125 and in the axial direction inside the cutting position X of the intermediate layer 125 cut in the cutting step S14 and in the vicinity of the cutting position X The method of forming the adhesive layer 127 is not particularly limited. For example, as shown in FIG. 7, it is formed by dropping the adhesive A constituting the adhesive layer 127 on the outer surface of the intermediate layer 125 and penetrating the inside thereof. By forming the adhesive layer 127 inside the intermediate layer 125, the respective fiber bundle single layers of the intermediate layer 125 are adhered to each other, and fraying on the end 125*a* is further suppressed.

(Cutting Process S14)

The cutting step S14 is performed after the intermediate layer placing step S12 or the adhesive layer placing step S13.

In the cutting step S14, the intermediate layer 125 is cut so that the end 125*a* of the intermediate layer 125 is positioned axially inner of the end 120*a* of the fiber bundle layer 120 The cutting is performed throughout the circumference of the intermediate layer 125. A method of cutting the intermediate layer 125 is not particularly limited, and examples thereof include a method using a disk type cutter.

As shown in FIG. 7, the cutting step S14 may cut the intermediate layer 125 such that the end 125*a* of the intermediate layer 125 is positioned axially inner of the mouthpiece 200. Thus, it is possible to reduce the outer diameter of the small-diameter end portion 103 of the tank body portion 100, it is possible to reduce the outer diameter of the base 200. In other words, the base 200 can be miniaturized. Also, the intermediate layer 125 may be cut so that the end 125*a* of the intermediate layer 125 overlaps with the insert ring 114 Thus, the liner 110 can be protected from load at the time of cutting by the insert ring 114

(Outer Layer Arrangement Process S15)

The outer layer placement step S15 is carried out after the cutting step S14. The outer layer disposing step S15 is a step of disposing the outer layer 126 on the outer surfaces of the intermediate layer 125 and the inner layer 124 (a part of the inner layer 124 which is not covered with the intermediate layer 125) The outer layer 126 is formed on the entire outer surface of these layers by knitting the fiber bundles with the outer surfaces of the intermediate layer 125 and the inner layer 124.

<Mouthpiece Arrangement Process S2>

Mouthpiece arrangement process S2 is performed after S1 of the tank main body preparation process. Mouthpiece arrangement step S2 is a step of arranging the mouthpiece 200 to the small-diameter end portion 103 of the tank main body portion 100. A method of disposing the base 200 at the small diameter end portion 103 of the tank body portion 100 is known.

<Manifold Process S3>

Manifold process S3 is performed after the die placement process S2. The manifold process S3 is the process of placing a manifold 300 that threadably engages the mouthpiece 200 and closes the open 103*a* of the reservoir body 100. Methods of placing the manifold 300 are known.

As described above, a method of manufacturing a tank of the present disclosure has been described using the manufacturing method of an embodiment. According to the method of manufacturing a tank of the present disclosure, it is possible to manufacture a tank capable of reducing the amount of fiber bundles while ensuring strength.

REFERENCE SIGNS LIST

100 Tank body
101 Torso
102 Shoulder
103 Small opening
110 Liner
111 Liner body
112 Liner shoulder
113 Liner small diameter end
114 Insert ring
120 Fiber bundle layer
121 Fiber bundle layer body
122 Fiber bundle layer shoulder
123 Small diameter end of fiber bundle layer
124 Inner layer
125 Intermediate layer
125*a* end
126 Outer layer
127 Adhesives layer
200 Mouthpiece
300 Manifold

What is claimed is:

1. A tank comprising:

a tank body part, an inside of the tank body part being able to be filled with a gas, the tank body part comprising a liner having a hollow cylindrical shape, and a fiber bundle layer covering an outer surface of the liner, wherein the fiber bundle layer has an inner layer, an outer layer, and an intermediate layer disposed between the inner layer and the outer layer, an end portion of the intermediate layer is located on an inner side than an end portion of the fiber bundle layer in an axial direction of the tank; and a mouthpiece disposed at an outer circumference of a smaller diameter end portion of the tank body part, wherein the end portion of the intermediate layer is located on an inner side than the mouthpiece in the axial direction wherein the inner layer is an innermost layer of the fiber bundle layer, which directly covers the entire outer surface of the liner;

the smaller diameter end portion of the tank body part comprises a liner small diameter end and a fiber bundle layer small diameter end portion, and the fiber bundle layer small diameter end portion comprises the inner layer and the outer layer; and the liner includes an insert ring proximate the liner small diameter end, and the end of the intermediate layer is disposed in an area overlapping with the insert ring.

2. The tank according to claim 1, wherein the fiber bundle layer has an adhesive layer inside the intermediate layer near but separated from the end portion of the intermediate layer;

wherein an arrangement position of the adhesive layer excludes a cutting position of the intermediate layer which is at the end portion of the intermediate layer.

* * * * *